US007010785B2

(12) United States Patent
Haber et al.

(10) Patent No.: US 7,010,785 B2
(45) Date of Patent: Mar. 7, 2006

(54) ELIMINATING COLD REGISTER STORE/RESTORES WITHIN HOT FUNCTION PROLOG/EPILOGS

(75) Inventors: Gad Haber, Nesher (IL); Moshe Klausner, Ramat Yishai (IL); Vadim Eisenberg, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 684 days.

(21) Appl. No.: 10/097,067

(22) Filed: Mar. 14, 2002

(65) Prior Publication Data

US 2004/0019884 A1 Jan. 29, 2004

Related U.S. Application Data

(60) Provisional application No. 60/278,486, filed on Mar. 23, 2001.

(51) Int. Cl.
*G06F 9/45* (2006.01)

(52) U.S. Cl. ..................................... 717/151
(58) Field of Classification Search ......... 717/151–161
See application file for complete search history.

(56) References Cited

U.S. PATENT DOCUMENTS

| | | | | | |
|---|---|---|---|---|---|
| 5,519,841 | A | * | 5/1996 | Sager et al. ................. | 711/202 |
| 5,768,595 | A | * | 6/1998 | Gillies ......................... | 717/145 |
| 5,790,865 | A | * | 8/1998 | Smaalders et al. ........... | 717/158 |
| 5,950,009 | A | * | 9/1999 | Bortnikov et al. ........... | 717/158 |
| 6,070,009 | A | * | 5/2000 | Dean et al. .................. | 717/130 |
| 6,292,934 | B1 | * | 9/2001 | Davidson et al. ............ | 717/158 |
| 6,854,110 | B1 | * | 2/2005 | Gillies et al. ................ | 717/159 |
| 6,862,730 | B1 | * | 3/2005 | Gorti et al. .................. | 717/159 |
| 2001/0018985 | A1 | | 9/2001 | Kanechika et al. | |

OTHER PUBLICATIONS

Aho et al., "Compilers, Principles, Techniques and Tools", Addison-Wesley, 1986, p. 585-722.*
Wu et al. Static Branch Frequency and Program Profile Analysis. ACM. 1994. pp. 1-11.*
Robert Cohn et al, "Optimizing Alpha Executables on Windows NT with Spike", Digital Technical Journal, vol. 9, No. 4, pp. 3-20, 1997.
Robert Cohn et al, "Hot Cold Optimization of Large Windows/NT Applications" Published in Proceedings of Micro 29, Dec. 2, 1996 Research Triangle Park, North California.
Milo Martin, et al "Exploiting Dead Value Information", Published in Proceedings of Micro-30, Dec. 1-3, 1997, Research Triangle Park, North California, pp. 1-11.
Gadi Haber et al, "Reliable Post-link Optimizations Based on Partial Information", Proceedings of Feedback Directed and Dynamic Optimizations Workshop 3, Dec. 2000, Monterey, California, pp. 91-100.
Ealan Henis et al, "Feedback Based Post-link Optimization for Large Subsystems", Second Workshop on Feedback Directed Optimization, Nov. 1999, Haifa, Israel, pp. 13-20.
W.J. Schmidt et al, "Profile-directed Restructuring of Operating System Code", IBM Systems Journal, vol. 37, No. 2, 1998, pp 270-297.
Robert Muth et al "Alto: A Link-Time Optimizer for the Compaq Alpha" [online] Nov. 2, 1999. Retrieved from Internet <http://www.cs.Arizona.edu/alto>.

* cited by examiner

*Primary Examiner*—Wei Y. Zhen
(74) *Attorney, Agent, or Firm*—Browdy and Neimark

(57) ABSTRACT

A post-link optimization method for removing non-volatile register store/restore instructions from a hot function prolog/epilog, when the non-volatile register is referenced only in cold sections of code within the hot function. The method requires that the hot function be disassembled, but does not require the full control flow graph.

36 Claims, 2 Drawing Sheets

ELIMINATING COLD REGISTER STORE/RESTORES WITHIN HOT FUNCTION PROLOG/EPILOGS

CROSS-REFERENCE TO RELATED APPLICATIONS

This application claims the benefit of U.S. Provisional Patent Application No. 60/278,486, filed Mar. 23, 2001. It is also related to co-pending U.S. patent application Ser. No. 09/798,879, filed Mar. 2, 2001 and to a U.S. patent application entitled, "Eliminating Store/Restores Within Hot Function Prolog/Epilogs Using Volatile Registers," and another U.S. patent application entitled "Percolating Hot Function Store/Restores to Colder Calling Functions," both filed on even date. All of these applications are assigned to the assignee of the present patent application, and their disclosures are incorporated herein by reference.

FIELD OF THE INVENTION

The present invention relates generally to optimization of computer code to achieve faster execution, and specifically to optimizing object code following compilation and linking of the code.

BACKGROUND OF THE INVENTION

Post-link code optimizers generally perform global analysis on the entire executable code, including statically-linked library code. Since the executable code will not be re-compiled or re-linked, the post-link optimizer need not preserve compiler and linker conventions. It can thus perform aggressive optimizations across compilation units, in ways that are not available to optimizing compilers. Additionally, a post-link optimizer does not require the source code to enable its optimizations, allowing optimization of legacy code and libraries where no source code is available.

At the same time, post-link optimizers must deal with difficulties that are not encountered in compile-time optimization. Optimizing compilers operate on input in the form of high-level language description, typically source code, whose semantics are clearly defined. By contrast, static post-link optimization tools receive as their input low-level executable instructions (object code). The post-link optimizer must first attempt to disassemble the object code in order to identify the data and instructions contained in the code. Even after disassembly, the semantics of executable code given to a post-link optimizer may be only partially known, for the following reasons:

Code instructions and data within an executable object are intermingled, making it impossible in some cases to distinguish between the two. Typically, there are code areas that cannot be classified unequivocally by the optimizer as either data or code instructions. In the context of the present patent application, these areas are referred to as "non-classified code areas."

Even for fully-classified code areas that are known to contain code instructions, the semantics of the program cannot always be determined. Machine instructions operate on registers, which may contain either data information or memory locations. Therefore, the optimizer may be uncertain as to whether a given instruction performs a pure data computation, or whether it calculates an address to be used later in the program to retrieve/store data or to perform a control transfer within the program code.

Data elements and their types, such as arrays, structures or scalars, can be identified only in a high-level language, such as C, C++, Pascal, etc. In post-link code, these elements appear as arbitrary data areas, and references to them are treated as arbitrary addresses. Therefore, at the post-link level, references to data elements cannot be fully resolved.

Because of these factors, the code semantics of the program may never be fully extracted from post-link code, and some of the dependencies between the data and code elements used by the program may remain uncertain.

Haber et al. describe an approach for dealing with these difficulties in an article entitled, "Reliable Post-Link Optimizations Based on Partial Information," in Proceedings of Feedback Directed and Dynamic Optimizations Workshop 3 (Monterey, Calif., December, 2000), pages 91–100, which is incorporated herein by reference. First, the program to be optimized is disassembled into basic blocks, by incrementally following all control flow paths that can be resolved in the program. The basic blocks are marked as either code, data or unclassified (not fully analyzed). Code blocks are further flagged according to their control flow properties. Partially analyzed areas of the program are delimited so as to contain the unclassified blocks, while relieving the rest of the program of the limitations that these blocks impose on optimization. The partially analyzed areas are chosen so that even when they cannot be internally optimized, they can still be repositioned safely en bloc to allow reordering and optimization of the code as a whole.

Use of post-link runtime profiling as a tool for optimization and restructuring is described by Henis et al., in "Feedback Based Post-Link Optimization for Large Sub-systems/" Second Workshop on Feedback Directed Optimization (Haifa, Israel, November, 1999), pages 13–20; and by Schmidt et al., in "Profile-Directed Restructuring of Operating System Code," IBM Systems Journal 37:2 (1998), pages 270–297. These publications are incorporated herein by reference.

Runtime profiling of the program creates a log recording usage statistics of each code block in two stages. First, in an instrumentation stage, each basic block is modified with either a new header or footer, wherein the added code increments a counter every time that basic block is run. In the second stage (the execution stage), the modified program is executed. At the end of the execution, the counters are written into a log file. Statistical analysis of the frequency of execution of each basic block provides a method to rank the code blocks by importance. Code blocks that are frequently executed are called "hot" blocks, as opposed to rarely executed "cold" blocks.

When a function using certain registers is called during execution of a program, it is generally necessary to store (save to memory) the contents of these registers before the function starts to run, and then to restore the register contents when the function returns. For this purpose, compilers typically add appropriate store instructions to a prolog of the function in the compiled code, with corresponding restore instructions in an epilog. Because memory access has become a bottleneck for modern high-speed processors, eliminating superfluous store and restore operations can reduce program execution time substantially.

Martin et al. describe a method of compiler optimization based on eliminating storing and restoring the contents of dead registers in "Exploiting Dead Value Information," published in Proceedings of Micro-30 (Research Triangle Park, N.C., 1997), which is incorporated herein by reference. Dead value information, providing assertions as to future use of registers, is calculated at compile time. The authors suggest that processor instruction set architectures be extended to enable this information to be communicated to the processor. In the absence of this hardware specialization, standard RISC call conventions may still allow a subset of the dead value information to be inferred and used by the processor in eliminating some of the store and restore operations at procedure calls and returns.

Cohn and Lowney describe a method of post-link optimization based on identifying frequently executed (hot) and infrequently executed (cold) blocks of code in functions in "Hot Cold Optimizations of Large Windows/NT Applications," published in Proceedings of Micro 29 (Research Triangle Park, N.C., 1996) which is incorporated herein by reference. Code blocks are classified into code (instructions) and data. The code sections are further classified into functions. Using profile information, the functions are analyzed to find code blocks that are rarely executed. By experimentation, the authors chose to optimize functions containing blocks with less the 1% probability of execution. The code blocks in such functions that are on the primary path of execution are labeled "hot," and the rarely executed code blocks are labeled "cold." All hot blocks of code in the hot function are copied to a new location. All calls to the function are redirected to the new location. Flow paths in the hot routine that target cold code blocks are redirected to the appropriate location in the original function. Once the control path returns to the original function, it does not pass back to the copied function.

The new function is then optimized at the expense of paths of execution that pass through the cold path. The optimization comprises identifying unneeded code in the new hot function, and moving it to a stub that is called when the cold portion of the function is invoked, before actually returning to the original function. Cohn and Lowney describe five different types of optimization of the hot code:

Partial dead code elimination—the removal of dead code from the hot function. Once the cold code is removed from the hot function, some of the remaining instructions may be superfluous. An example of such an instruction is an add instruction that writes to a register that is only referenced within the cold code but is positioned within the hot block. The dead code is moved to the stub.

Non-volatile register elimination—the removal of the save and restore of non-volatile registers in the hot procedure. Non-volatile registers must be stored (restored) in the function prolog (epilog). Once dead code is removed from the hot function, the use of the non-volatile registers in the hot function is analyzed. If the registers are only referenced in the cold code, the store (restore) instructions are removed from the prolog (epilog) of the hot function, and the store instructions are moved to the stub. Since the cold code is followed by the original function epilog, the original restore instructions will restore the registers.

Stack pointer adjust elimination—the removal of the stack adjusts in the hot function. If all the non-volatile store instructions can be removed from the function prolog, the stack pointer adjustment (on computer architectures that require stack adjusts) can also be moved to the stub.

Peephole optimization—the removal of self-assignments and conditional branches with an always-false condition. Once the dead code is removed and excess non-volatile registers are freed, an additional pass through the code can identify instructions that are now irrelevant. An example of such an instruction is a restore instruction of a removed register that was turned into a self-assignment by copy propagation.

Inlining the hot function—the removal of control transfer to the hot function. Code straightening can be applied to the optimized code to inline the hot function.

Cohn and Lowney have implemented their methods of optimization in a tool named "Spike," which is used to optimize executables for the Windows NT™ operating system running on Alpha™ processors. Their method of classifying blocks as hot or cold requires a complete understanding of the control flow within the function. It cannot be used if unclassified blocks appear in the control flow of the hot function. The method of eliminating non-volatile registers also requires that there be no references to the non-volatile register left in the function after removal of dead code.

Muth et al. describe the link-time optimizer tool "alto" in "alto: A Link-Time Optimizer for the Compaq Alpha," published in Software Practice and Experience 31 (January 2001), pages 67–101, which is incorporated herein by reference. Alto exploits the information available at link time, such as content of library functions, addresses of library variables, and overall code layout, to optimize the executable code after compilation. Alto can identify control paths where stores (restores) of non-volatile registers in function prologs (epilogs) are unnecessary, either because the registers are not touched along all execution paths through a function, or because the code that used those registers became unreachable. Code can become unreachable due to other optimizations carried out by alto, for instance because the outcome of a conditional branch could be predicted as a result of interprocedural constant propagation. The number of such stores (restores) can be reduced by moving them away from execution paths that do not need them.

Alto is similar to Spike in that its optimizations require a complete understanding of the control flow within the function. The store (restore) replacements are only carried out after other optimization techniques have created dead code within the function.

SUMMARY OF THE INVENTION

Preferred embodiments of the present invention provide generalized methods for post-link reduction of store and restore instructions in function prologs and epilogs based on run-time profiler feedback information, in order to optimize program execution. The methods of the present invention enable global program optimization, since they treat the entire executable code as a unified whole, unlike compiler optimizations, which are generally limited to the scope of the optimization unit.

Furthermore, while optimizing compilers are bound by linkage conventions, the post-link optimizer can ignore these conventions in removing unnecessary store and restore instructions. The methods of the present invention can thus be used to eliminate unneeded memory operations more thoroughly than is possible when only compile-time tools are used. These methods can be used for code optimization even when the source code is unavailable for compile-time optimizations, as may be the case when legacy object code or statically-linked object code libraries are incorporated in the executable. In addition, the methods of the present invention can be used even when the control flow within the program is only partially understood.

In preferred embodiments of the present invention, a post-link optimizer disassembles post-link object code in order to identify basic blocks of code in the executable file. It is not necessary to analyze the entire control flow graphs of the functions, as in optimization methods known in the art, but only to determine their constituent instructions. Basic blocks are identified as functions, code within functions, and data. The functions typically have a prolog and an epilog, containing store and restore instructions with respect to registers used by the function. These registers are referred to herein as non-volatile registers. Run-time profiling, as is known in the art, is used to identify hot (i.e., frequently-executed) functions and cold code blocks within the hot functions.

The optimizer locates a non-volatile register stored/restored in a hot prolog/epilog of a function which is referenced only within cold code blocks in the function's bodies. When the non-optimized program runs, the number of times these registers are stored (restored) in the function prolog (epilog) is much greater than the number of times they are actually referenced in the cold blocks. Therefore, the optimizer preferably replaces each instruction that references the identified non-volatile register in the function with an instruction that references the memory location reserved for saving that register in the prolog.

In cases in which the architecture does not support an equivalent instruction that references memory, the optimizer uses a temporary free register (i.e., a register to which a new value will be assigned before the next time the register is used) as an intermediator for the memory location. The optimizer replaces each instruction that references the identified non-volatile register with a branch instruction to a wrapper code. The wrapper code includes the instruction that previously used the identified register, now modified so as to reference the temporary free register. If the instruction uses the value of the register, it will be preceded with a load instruction from the memory location to the temporary free register. If the instruction assigns a new value to the register, it will be followed by a store instruction of the temporary free register to the memory location.

The wrapper code is preferably appended to the end of the original post-link code. Although the optimized code is typically longer than the original post-link code, and although the branch instructions to and from the wrapper code can cause cache misses, additional optimization steps as are known in the art, such as code straightening, can be applied to the code after the wrapper code has been added in order to alleviate these problems. Typically, after performing the optimization described above, a code-straightening algorithm is applied to the generated code in order to remove the unconditional branches to and from the wrapper codes. Straightening algorithms are known in the art of post-link optimization tools, such as the FDPR (Feedback Directed Program Restructuring) tool offered by IBM Corporation (Armonk, N.Y.) as part of the Performance Tool Box (PTX) for the AIX™ operating system. Further aspects of the FDPR are described in the above-mentioned articles by Haber et al., Henis et al., and Schmidt et al.

After eliminating all of the references to a given cold non-volatile register in the function, the optimizer then modifies the post-link code so as to eliminate the unneeded store instruction from the function prolog and the corresponding restore instruction from the epilog, by replacing them with NOP instructions.

Alternatively, if the store instructions are conveniently ordered (or can be reordered) in the beginning of the prolog of a function that is analyzed and modified as described above, calls to the hot function in the post-link code may be redirected so as to skip the unnecessary store instructions or their replacing NOPs. Other methods for modifying the code will be apparent to those skilled in the art and are considered to be within the scope of the present invention.

There is therefore provided, in accordance with a preferred embodiment of the present invention, a method for code optimization, including:

disassembling object code that has been compiled and linked;

analyzing the disassembled code so as to identify a function in the code, the function including store and restore instructions with respect to a non-volatile register that is referenced in a section of the function, which section is executed infrequently when the function is run; and modifying the code so that the section of the function references a substitute location, typically a memory location, instead of the non-volatile register, and so as to eliminate a pair of the store and restore instructions with respect to the non-volatile register.

Preferably, analyzing the disassembled code comprises:

identifying basic blocks of code, the function including a plurality of the basic blocks, one or more of which contain the section that is executed infrequently; and profiling the basic blocks of code so as to determine a frequency of execution of the blocks in the function.

More preferably, analyzing the code includes identifying a temporary free register with respect to the instruction, and modifying the code includes replacing an existing instruction within the section of the function that references the non-volatile register with one or more new instructions referencing the temporary free register with respect to the instruction instead of the non-volatile register.

Preferably, when the existing instruction uses the value in the non-volatile register, the one or more new instructions include a load instruction from a location in memory to the temporary free register, typically as the first instruction among the one or more new instructions.

Further preferably, when the existing instruction assigns a value to the non-volatile register, the one or more new instructions include a store instruction from the temporary free register to a location in memory, typically as the last instructions among the one or more new instructions.

Further preferably, replacing the existing instructions includes replacing the existing instruction with a branch to a wrapper code that contains the one or more new instructions.

Most preferably, the object code includes a fixed sequence of code instructions ending with a last instruction, and wherein the wrapper code is added to the code after the last instruction, and wherein replacing the existing instruction includes replacing the instruction with the branch to the wrapper code without altering the fixed sequence within the code.

In a preferred embodiment, modifying the code includes replacing an existing instruction within the section of the function that references the non-volatile register with a new instruction that references a location in the memory.

In another preferred embodiment, the function includes a fixed sequence of code instructions, and modifying the code includes eliminating the pair of the store and restore instructions without altering the fixed sequence or replacing them with NOP instructions.

In an alternative embodiment, the function includes a fixed sequence of code instructions, and modifying the code to eliminate the pair of the store and restore instructions includes reordering the instructions so as to make the store instruction a first instruction in the function, and further modifying control transfers to the function in the code so as to skip over the store instruction or its replacing NOP instruction.

In another alternative embodiment, the function includes a final instruction to transfer control upon completion of the function, and modifying the code to eliminate the pair of the store and restore instructions includes reordering the instructions so as to make the restore instruction a last instruction in the function before the control transfer instruction, and further replacing the restore instruction with the control transfer instruction.

In a preferred embodiment, modifying the code includes recompiling the object code.

There is additionally provided, in accordance with a preferred embodiment of the present invention, an apparatus for code optimization, including a code processor, which is arranged to disassemble object code that has been compiled and linked, and to analyze the disassembled code so as to identify a function in the disassembled code, the function including store and restore instructions with respect to a non-volatile register that is referenced in a section of the function, which section is executed infrequently when the function is run, and which is further arranged to modify the code so that the section of the function references a substitute memory location, instead of the non-volatile register, and so as to eliminate a pair of the store and restore instructions with respect to the non-volatile register.

There is also provided, in accordance with a preferred embodiment of the present invention, a computer software product including a computer-readable medium in which software is stored, which software, when read by a computer, causes the computer to disassemble object code that has been compiled and linked, and to analyze the disassembled code so as to identify a function in the disassembled code, the function including store and restore instructions with respect to a non-volatile register that is referenced in a section of the function, which section is executed infrequently when the function is run, and to modify the code so that the section of the function references a substitute location, instead of the non-volatile register, and so as to eliminate a pair of the store and restore instructions with respect to the non-volatile register.

The present invention will be more fully understood from the following detailed description of the preferred embodiments thereof, taken together with the drawings in which:

DETAILED DESCRIPTION OF PREFERRED EMBODIMENTS

Figure 1:
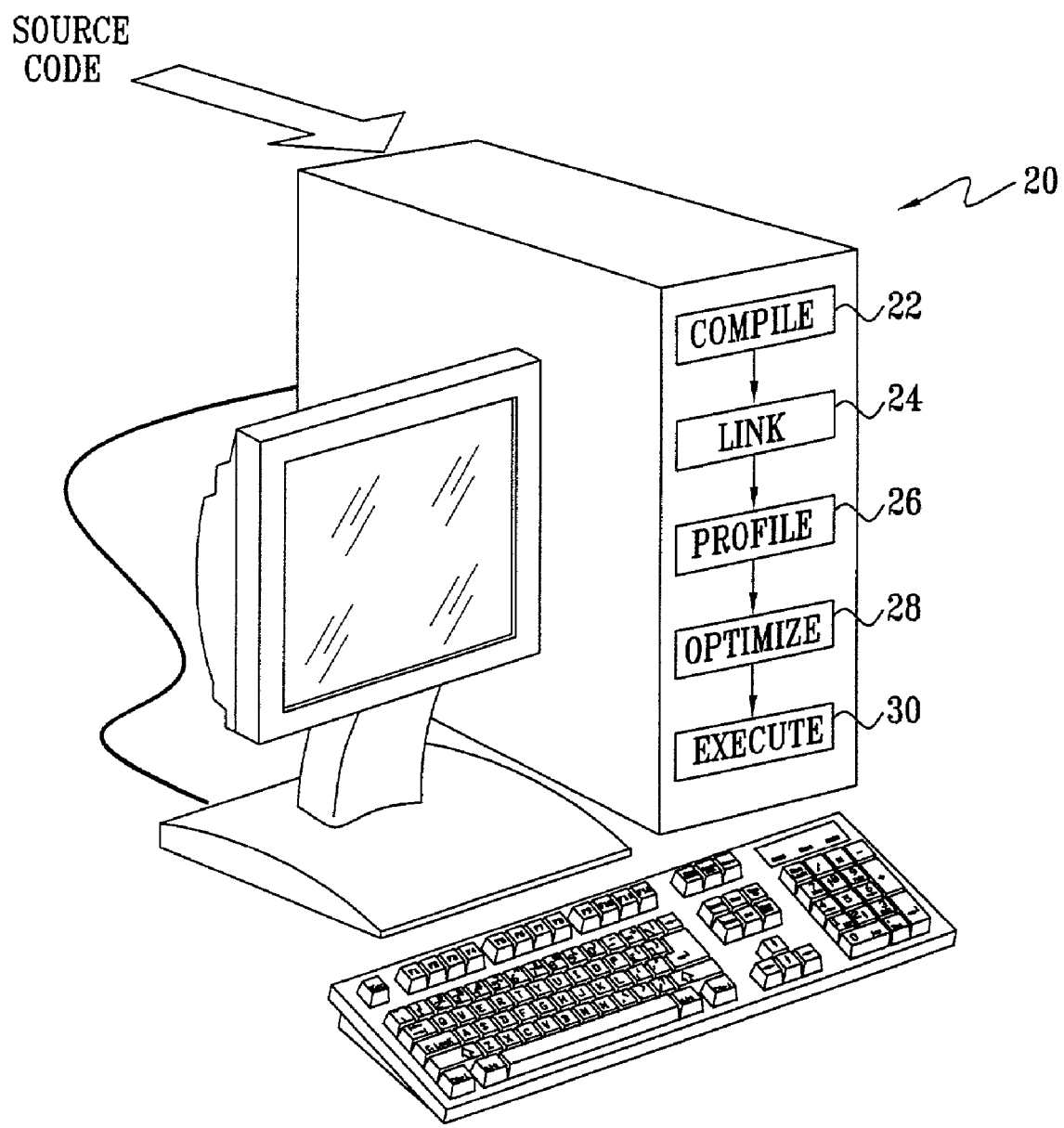
FIG. 1 is a block diagram that schematically illustrates a system for processing computer program code, in accordance with a preferred embodiment of the present invention.

FIG. 1 is a block diagram that schematically illustrates a system 20 for processing computer program code, in accordance with a preferred embodiment of the present invention. System 20 preferably comprises a general-purpose computer processor, which is programmed to carry out the functions described hereinbelow. The processor performs these functions under the control of software supplied for this purpose. The software may be downloaded to the processor in electronic form, over a network, for example, or it may alternatively be provided on tangible media, such as CD-ROM.

System 20 typically receives source code that is prepared by a programmer. A compiler 22 compiles the source code to generate object code, and a linker 24 links the compiled code with library code, as is known in the art. The linked code is fed to a profiler 26, which obtains run-time information about the frequency of execution of each block of object code in the linked code. The profiled code is fed to an optimizer 28, which labels often-run blocks as "hot" and seldom-run blocks as "cold," and then analyzes and modifies the code to eliminate non-volatile register store/restore instructions located in the prolog and epilog of hot functions, as described in detail hereinbelow. The optimized code can then be executed by a run-time module 30, as is likewise known in the art. Although all of functions 22 through 30 are shown for simplicity as being performed in system 20, it will be appreciated that these functions may also be separated and carried out on different computers. Thus, optimizer 28, which is the element of concern to the present invention, may receive profiled post-link code from another source, outside system 20, and may pass the optimized code to yet another computer for execution.

Figure 2:
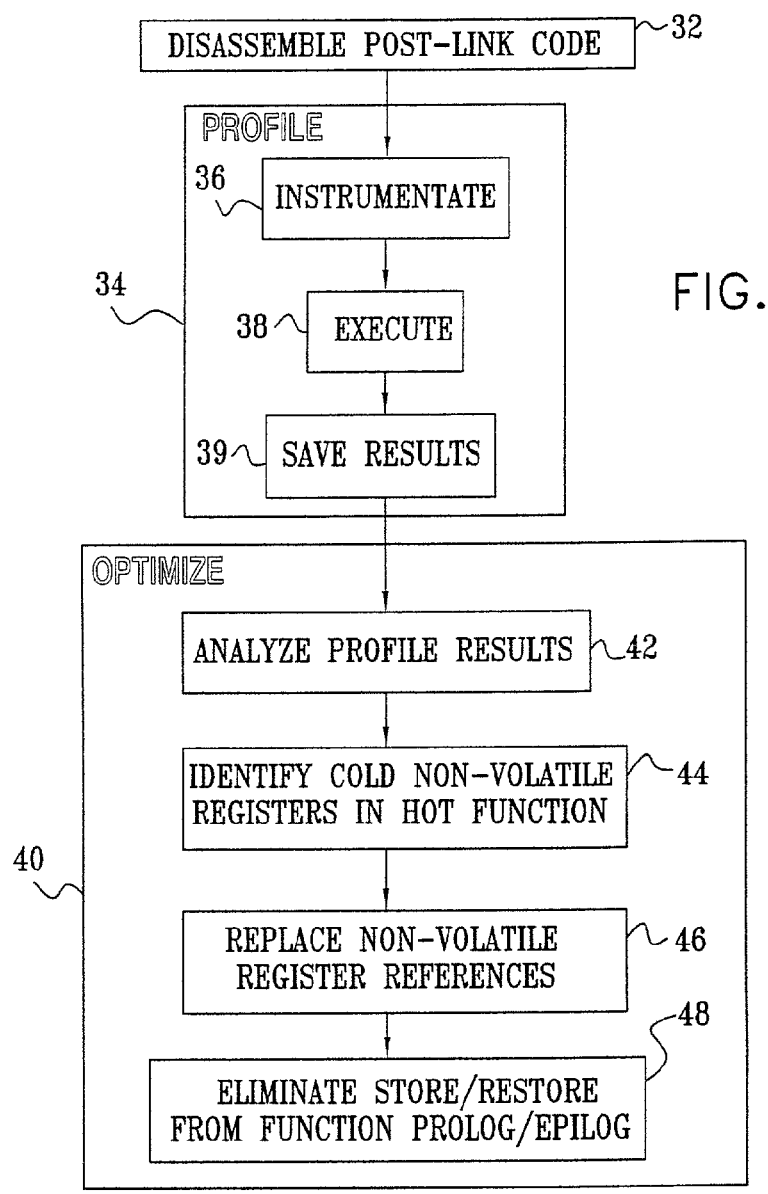
FIG. 2 is a flow chart that schematically illustrates a method for optimizing post-link code, in accordance with a preferred embodiment of the present invention.

FIG. 2 is a flow chart that schematically illustrates a method for optimizing post-link code, carried out by optimizer 28, in accordance with a preferred embodiment of the present invention. The post-link code is disassembled, at a disassembly step 32, in order to identify the instructions in the code. Any suitable method known in the art can be used for this purpose. Preferably, an incremental disassembly method is used to dissect the code into its basic blocks, as described in the above-mentioned articles by Haber et al. and by Henis et al., for example. For this purpose, addresses of instructions within the executable code are extracted from a variety of sources, in order to form a list of "potential entry points." The sources typically include program/DLL entry points, the symbol table (for functions and labels), and relocation tables (through which pointers to the code can be accessed). The optimizer traverses the program by following the control flow starting from these entry points—while resolving all possible control flow paths—and adding newly-discovered addresses of additional potential entry points to the list, such as targets of JUMP and CALL instructions.

Following the control flow of the program in this manner covers a large percentage of the code. Basic blocks that are not directly discoverable by incremental disassembly are marked as "unclassified code," These blocks typically consist of code reached via a jump by a target register that is resolved only at runtime. It is sometimes possible to classify these blocks using instrumentation of the code and dynamic runtime analysis, as described by Henis et al., but a description of this method is beyond the scope of the present patent application.

At the end of the incremental disassembly process, the entire code section of the original program is dissected into basic blocks, which are either classified or unclassified. The classified blocks are marked with flags, which characterize them as either code or data (such as branch table data), and which identify the control flow properties of the code blocks, such as Fallthrough, Continue, Call, Return, Jump, etc. The Call and Return flags, inter alia, are used to identify functions and function calls in the code.

The disassembled code is profiled in a code profiling stage 34. Profiling begins at an instrumentation step 36, wherein each basic block is modified so that each time the program execution passes through the block a counter is incremented, as described in the above-mentioned article by Henis et al., in section 2.3. Additional code is added to the beginning of each basic block, termed instrumentation code. This code performs a CALL jump to a universal stub function. The universal stub function makes use of the return address argument passed by the CALL instruction to identify from which basic block it was called. The counter for that basic block is incremented each time the universal stub is called from within that block during the profiling run. The universal stub function then returns execution to the calling basic block.

A second method of instrumentation, useful on platforms with no CALL instruction, comprises overriding the last instruction of each basic block with a JUMP instruction to a designated code area that is appended to the end of the original code section. In that area, the counter associated with the basic block is incremented. The overwritten last instruction that was taken from the original basic block is executed in the appended area, thus maintaining the original program semantics. Using this method, the original code section size is kept intact, and most of the code is unaltered (except the overwritten last instructions of the basic blocks, which in most cases are control transferring instructions).

The instrumented program is run at an execution step 38. On profiling run termination, the information is retrieved from the counters and written to a log file, at a save results step 39.

In an optimization stage 40, the optimizer receives the log file and the disassembled code. This stage begins with a profiling analysis step 42, in which the basic blocks are classified by the frequency of execution. Frequently-executed blocks are labeled "hot," and rarely-executed blocks are labeled "cold." Correspondingly, hot (cold) functions are functions that are called frequently (rarely). Typically, each of the functions identified at step 32 has a prolog and an epilog, containing instructions to store and then restore the contents of certain registers that are used by the function. In the context of the present patent application, these registers are referred to as "non-volatile registers."

The treatment of the non-volatile registers in each of the functions is analyzed at a cold register identification step 44. For each hot function f, the optimizer determines the following information:

REG(f)—the set of all non-volatile registers used in hot function f.
CREG(f)—the sub-set of REG(f) referenced only within cold blocks within the body of hot function f.
OREG(f)—the sub-set of CREG(f) where for each instruction that references a register in CREG(f) there exists a temporary free register. A temporary free register is any register whose value may be changed without affecting the program result.
MEM(f,r)—the memory location reserved for saving each register r in the prolog of function f.

Accordingly, the program code is modified to eliminate the references to a register r in OREG(f) at a register replacement step 46. Then the store and restore instructions of register r in the function prolog and epilog are replaced with NOP instructions, at a modification step 48. Alternatively, other methods of code modification may be used to achieve the same end. Some alternative methods are described below.

Most preferably, the optimizer replaces the reference to register r with MEM(f,r) at register replacement step 46. However, no direct replacement may be possible if the platform instruction set does not include an equivalent instruction using a reference to memory instead of a reference to a register. For instance, the instruction may use the contents of the register as an address in memory from which to retrieve an operand. Additionally, the platform may not allow memory references in arithmetic operations, as on reduced instruction set (RISC) platforms. In such cases the optimizer replaces the reference to non-volatile register r with a reference to a temporary free register. The single instruction referencing r is replaced with a group of instructions located in a wrapper code, as described below.

Figure 3:
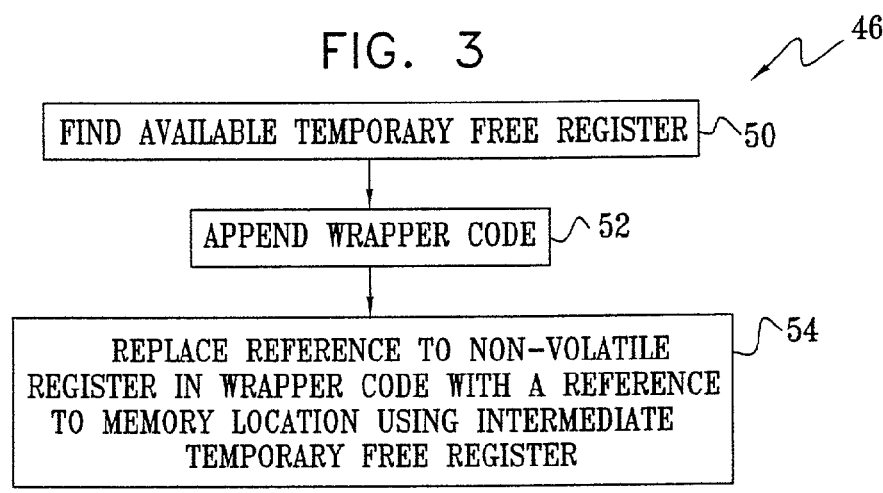
FIG. 3 is a flow chart that schematically illustrates a method for eliminating references to non-volatile registers within a function, through use of wrapper code, in accordance with a preferred embodiment of the present invention.

FIG. 3 is a flow chart that schematically illustrates a preferred method for eliminating references to an optimizable register Rx in the set of registers OREG(f), through use of wrapper code in register replacement step 46. At a free register location step 50, the optimizer finds a temporary free register Ry. For example, any register whose value is changed in the cold block containing the replaced instruction, and not used in the block can be used for Ry. If the control flow is known, any register whose value is overwritten at some path (without being used before) can be used as Ry.

The optimizer creates a new section of wrapper code and appends it to the object code at a wrapper creation step 52. The original instruction that references Rx, INSTRx, is replaced with an unconditional branch to the wrapper code. The wrapper code comprises:

1. If INSTRx uses Rx (i.e. uses the value held in Rx), a load instruction that loads MEM(f,Rx) into Rx;
2. INSTRX;
3. If INSTRx assigns a value to Rx, a store instruction that stores in MEM(f,Rx) the value of Rx; and
4. A branch instruction back to the instruction following INSTRX in the hot function.

At a register replacement step 54, all references to Rx in the wrapper code are replaced by references to Ry.

There are cases in which a single store/restore instruction in the prolog/epilog of a function replaces several store/restore instructions. These multiple store/restore instructions are given starting and ending boundaries of non-volatile registers to be stored/restored. In cases where the optimizable register is stored/restored by such an instruction, there are no store/restore instructions associated with the optimizable register to be replaced with a NOP. In this case, the optimizer will preferably rename the lower registers used by the multiple store/restore instruction with the optimizable registers throughout the function. After renaming, the optimizer changes the starting boundary of the multiple store/restore instruction so as to avoid the optimized registers.

Typically, the single cold basic block may contain several consecutive references to the same optimizable register Rx. In this case, if a temporary free register Ry exists for all the consecutive references to Rx, then optimization is preferably improved as follows:

1. Do not include a store instruction in the wrapper code for the first reference to Rx.
2. Do not include a load instruction in the wrapper code for the last reference to Rx.
3. Do not include any wrapper code at all for the intermediate references.
4. Rename Rx with the same Ry in all the references.

In some cases, the instruction referencing Rx is preferably replaced with an alternative instruction referencing a location in memory, rather than referencing register Ry. In this case, no wrapper code is needed. The alternative instruction directly replaces the INSTRX with an instruction that directly references MEM(f,Rx) without needing an intermediary temporary register. Such alternative instructions are typically available only on computing platforms with a rich set of instructions.

Table I below lists sample disassembled post-link code of a hot function foo. For the sake of this example, foo is characterized by OREG(foo)=R30, i.e., R30 is a non-volatile register in the hot function prior to optimization, which is referenced only by a cold block in the function. The hot function foo contains cold code sections L1, L3, L5, and L7, which reference R30. The left column in the table below shows the post-link code before optimization, while the right column shows the code after optimization by replacing the use of R30 by use of a memory location and intermediate temporary free registers. Hot code is shown in boldface, while cold code is shown in regular type.

TABLE I

CODE COMPARISON
Hot code is highlighted in bold type.

| Before optimization | After optimization |
| --- | --- |
| program begin | program begin |
| ... | ... |
| function foo: | function foo: |
| Prolog: | Prolog: |
| store R29,4(SP) | store R29,4(SP) |
| store R30,8(SP) | NOP |
| store R31,12 (SP) | store R31,12(SP) |
| ... | ... |
| Body: | Body: |
| L1: R30 <- 7 {R30 def} | L1: branch W1 {to wrap code} |
| L2: R4 <- R31 | L2: R4 <- R31 |
| ... | ... |
| L3: R31 <- (R30) {R30 use} | L3: branch W2 {to wrap code} |
| L4: R5 <- 25 | L4: R5 <- 25 |
| ... | ... |
| L5: add R30,R30,13 {R30 def+use} | L5: branch W3 {to wrap code} |
| L6: R7 <-R5 | L6: R7 <-R5 |
| ... | ... |
| L7: R30<-R12 | L7: R12->8(SP) |
| Epilog: | Epilog: |
| load R29,4(SP) | load R29,4(SP) |
| load R30,8(SP) | NOP |
| load R31,12(SP) | load R31,12(SP)NOP |
| return | return |
| ... | ... |
| program end | W1: R4 <- 7 {R30 renamed R4} |
|  | store R4,8(SP) |
|  | branch L2 |
|  | W2: load R5,8(SP) |
|  | R31<-(R5) {R30 renamed R5} |
|  | branch L4 |
|  | W3: load R7,8(SP) |
|  | add R7,R7,13 |
|  | store R7,8(SP) |
|  | branch L6 |
|  | program end |

At line L1 in the original code, a new value is assigned to R30. In this case, the optimizer replaces the instruction L1 with a branch to wrapper code W1, which includes the original instruction from L1 with R30 renamed to R4, a store instruction to save the modified value into MEM(f,R30), and a branch instruction to return control flow to L2. The execution of the store instruction insures that the memory location will always hold the current value of the replaced non-volatile register. If the instruction set allows storing the value directly to MEM(f,R30), no wrapper code would have been necessary. The optimizer in this case would replace the instruction "R30<-7" with the instruction "store 7, 8 (SP)".

At line L3 in the original code, the value of R30 is used. In this case the optimizer replaces the instruction L3 with a branch to wrapper code W2, which includes a load from MEM(f,R30) to R5, the original instruction from L2 with R30 renamed to R5, and a branch instruction to return control flow to L4. The execution of the load instruction insures that the temporary free register R5 contains the correct value prior to its use. Alternatively, if possible, the optimizer replaces the reference in the original instruction to R30 with a reference to MEM(f,R30) and uses no wrapper code.

At line L5 in the original code, a new value is assigned to R30 by an instruction that increments the value of R30. Since the value of R30 is both used and set, the wrapper code at W3 must contain both a load and a store instruction.

The optimizer replaces the reference to R30 with a reference to MEM(f,R30) at line L7. No wrapper code is needed, as a valid instruction that directly stores the value into MEM(f,R30) replaces the instruction that assigns a value to R30.

Preferably, after performing the optimization, a code-straightening algorithm is applied to the generated code in order to remove NOP instructions and unconditional branches to and from the wrapper codes. Straightening algorithms are known in the art of post-link optimization tools, such as the FDPR (Feedback Directed Program Restructuring) tool offered by IBM Corporation (Armonk, N.Y.) as part of the Performance Tool Box (PTX) for the AIX™ operating system. Further aspects of FDPR are described in the above-mentioned articles by Haber et al., Henis et al., and Schmidt et al.

It may also occur that, for a given function call instruction to f, the store instructions regarding the set of optimizable non-volatile registers OREG(f), are the first consecutive instructions in the prolog of the function. Alternatively, it may be that these store instructions can be rescheduled to the beginning of the prolog without affecting the program semantics. In such cases, as noted above, the NOP instructions can be avoided for some of the calls to f, simply by redirecting these call instructions to skip the first instructions of f that contain NOPs. This approach allows slightly faster execution since the NOP instruction is not executed.

The preferred embodiments described above are all based on the assumption that for the sake of safety, the original post-link code cannot be expanded or shrunk during optimization. The principles of the present invention can also be applied, however, in an environment that enables deletion, addition and movement of code. In this environment, the need for wrapper codes can be avoided by instead inserting the required store and load instructions directly before and after the corresponding cold code references to Rx in f. Such an environment is provided by some post-link compilers, particularly when the entire program can be successfully disassembled, as well as within the framework of an optimizing compiler that exploits profiling information.

It will thus be appreciated that the preferred embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A computer-implemented method for code optimization, comprising:
    disassembling object code that has been compiled and linked;
    analyzing the disassembled code so as to identify a function in the code, the function including store and restore instructions with respect to a non-volatile register that is referenced in a section of the function, which section is executed infrequently when the function is run; and
    modifying the code so that the section of the function references a substitute location, instead of the non-volatile register, and so as to eliminate a pair of the store and restore instructions with respect to the non-volatile register.

2. A method according to claim 1, wherein analyzing the disassembled code comprises:
    identifying basic blocks of code, the function comprising a plurality of the basic blocks, one or more of which contain the section that is executed infrequently; and
    profiling the basic blocks of code so as to determine a frequency of execution of the blocks in the function.

3. A method according to claim 1, wherein analyzing the code comprises identifying a temporary free register, and wherein modifying the code comprises replacing an existing instruction within the section of the function that references the non-volatile register with one or more new instructions referencing the temporary free register instead of the non-volatile register.

4. A method according to claim 3, wherein when the existing instruction uses a value in the non-volatile register, the one or more new instructions comprise a load instruction from a location in memory to the temporary free register.

5. A method according to claim 3, wherein when the existing instruction assigns a value to the non-volatile register, the one or more new instructions comprise a store instruction from the temporary free register to a location in memory.

6. A method according to claim 3, wherein replacing the existing instruction comprises replacing the existing instruction with a branch to a wrapper code that contains the one or more new instructions.

7. A method according to claim 6, wherein the object code comprises a fixed sequence of code instructions ending with a last instruction, and wherein the wrapper code is added to the code after the last instruction, and wherein replacing the existing instruction comprises replacing the instruction with the branch to the wrapper code without altering the fixed sequence within the code.

8. A method according to claim 1, wherein modifying the code comprises replacing an existing instruction within the section of the function that references the non-volatile register with a new instruction that references a location in a memory.

9. A method according to claim 1, wherein the function comprises a fixed sequence of code instructions, and modifying the code comprises replacing the pair of the store and restore instructions with NOP instructions.

10. A method according to claim 1, wherein modifying the code to eliminate the pair of the store and restore instructions comprises reordering the instructions so as to make the store instruction a first instruction in the function, and further modifying control transfers to the function in the code so as to skip over the store instruction.

11. A method according to claim 1, wherein the function comprises a final instruction to transfer control upon completion of the function, and wherein modifying the code to eliminate the pair of the store and restore instructions comprises reordering the instructions so as to make the restore instruction a last instruction in the function before the instruction to transfer control, and further replacing the restore instruction with the control transfer instruction.

12. A method according to claim 1, wherein modifying the code comprises recompiling the object code.

13. An apparatus for code optimization, comprising a code processor, which is arranged to disassemble object code that has been compiled and linked, and to analyze the disassembled code so as to identify a function in the disassembled code, the function including store and restore instructions with respect to a non-volatile register that is referenced in a section of the function, which section is executed infrequently when the function is run, and which is further arranged to modify the code so that the section of the function references a substitute location, instead of the non-volatile register, and so as to eliminate a pair of the store and restore instructions with respect to the non-volatile register.

14. An apparatus according to claim 13, wherein the code processor is arranged to analyze the disassembled code so as to identify basic blocks of code within the function, one or more of which contain the section that is executed infrequently, and to profile the basic blocks of code so as to determine a frequency of execution of the blocks in the function.

15. An apparatus according to claim 13, wherein the code processor is arranged to identify a temporary free register unused in the section of the function, and to modify the code by replacing an existing instruction within the section of the function that references the non-volatile register with one or more new instructions referencing the temporary free register instead of the non-volatile register.

16. An apparatus according to claim 15, wherein the code processor is arranged, when the existing instruction uses a value in the non-volatile register, to add an instruction to the one or more new instructions comprising a load instruction from a location in memory to the temporary free register.

17. An apparatus according to claim 15, wherein the code processor is arranged, when the existing instruction assigns a value to the non-volatile register, to add an instruction to the one or more new instructions comprising a store instruction from the temporary free register to a location in memory.

18. An apparatus according to claim 15, wherein the code processor is arranged to replace the existing instruction with a branch to a wrapper code that contains the one or more new instructions.

19. An apparatus according to claim 18, wherein the object code comprises a fixed sequence of code instructions ending with a last instruction, and wherein the code processor is arranged to add the wrapper code after the last instruction, and to replace the existing instruction with the branch to the wrapper code without altering the fixed sequence within the code.

20. An apparatus according to claim 13, wherein the code processor is arranged to modify the code by replacing an existing instruction within the section of the function that references the non-volatile register with a new instruction that references a location in memory.

21. An apparatus according to claim 13, wherein the function comprises a fixed sequence of code instructions, and wherein the code processor is arranged to modify the code so as to replace the pair of the store and restore instructions with NOP instructions.

22. An apparatus according to claim 13, wherein the code processor is arranged to modify the code by reordering the instructions so as to make the store instruction a first instruction in the function, and by modifying control transfers to the function in the code so as to skip over the store instruction.

23. An apparatus according to claim 13, wherein the function comprises a final instruction to transfer control upon completion of the function, and wherein the code processor is arranged to modify the code by reordering the instructions so as to make the restore instruction a last instruction in the function before the instruction to transfer control, and further by replacing the restore instruction with the control transfer instruction.

24. An apparatus according to claim 13, wherein the code processor is arranged to modify the code by recompiling the object code.

25. A computer software product, comprising a computer-readable medium in which software is stored, which software, when read by a computer, causes the computer to disassemble object code that has been compiled and linked, and to analyze the disassembled code so as to identify a function in the disassembled code, the function including store and restore instructions with respect to a non-volatile register that is referenced in a section of the function, which section is executed infrequently when the function is run, and to modify the code so that the section of the function references a substitute location, instead of the non-volatile register, and so as to eliminate a pair of the store and restore instructions with respect to the non-volatile register.

26. A product according to claim 25, wherein the software causes the computer to analyze the disassembled code so as to identify basic blocks of code within the function, one or more of which contain the section that is executed infrequently, and to profile the basic blocks of code so as to determine a frequency of execution of the blocks in the function.

27. A product according to claim 25, wherein the software causes the computer to identify a temporary free register unused in the section of the function, and to modify the code by replacing an existing instruction within the section of the function that references the non-volatile register with one or more new instructions referencing the temporary free register instead of the non-volatile register.

28. A product according to claim 27, wherein the software causes the computer, when the existing instruction uses a value in the non-volatile register, to add an instruction to the one or more new instructions comprising a load instruction from a location in memory to the temporary free register.

29. A product according to claim 28, wherein the software causes the computer, when the existing instruction assigns a value to the non-volatile register, to add an instruction to the one or more new instructions comprising a store instruction from the temporary free register to the location in memory.

30. A product according to claim 27, wherein the software causes the computer to replace the existing instruction with a branch to a wrapper code that contains the one or more new instructions.

31. A product according to claim 30, wherein the object code comprises a fixed sequence of code instructions ending with a last instruction, and wherein the software causes the computer to add the wrapper code after the last instruction, and to replace the existing instruction with the branch to the wrapper code without altering the fixed sequence within the code.

32. A product according to claim 25, wherein the software causes the computer to modify the code by replacing an existing instruction within the section of the function that references the non-volatile register with a new instruction that references a location in memory.

33. A product according to claim 25, wherein the function comprises a fixed sequence of code lines, and the software causes the computer to modify the code so as to replace the pair of the store and restore instructions with NOP instructions.

34. A product according to claim 25, wherein the software causes the computer to modify the code by reordering the instructions so as to make the store instruction a first instruction in the function, and by modifying control transfers to the function in the code so as to skip over the store instruction.

35. A product according to claim 25, wherein the function comprises a final instruction to transfer control upon completion of the function, and wherein the software causes the computer to reorder the instructions so as to make the restore instruction a last instruction in the function before the instruction to transfer control, and to replace the restore instruction with the control transfer instruction.

36. A product according to claim 25, wherein the software causes the computer to modify the code by causing a recompilation of the object code.

* * * * *